United States Patent
Sadavarte et al.

(10) Patent No.: US 11,899,543 B2
(45) Date of Patent: Feb. 13, 2024

(54) HIGH-FREQUENCY VIRTUAL MACHINE RESTORE POINTS

(71) Applicant: Nutanix, Inc., San Jose, CA (US)

(72) Inventors: Mayur Vijay Sadavarte, Sunnyvale, CA (US); Vanita Prabhu, Bengaluru (IN); Bharat Kumar Beedu, Bangalore (IN); Parthasarathy Ramachandran, Palo Alto, CA (US); Monoreet Mutsuddi, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 236 days.

(21) Appl. No.: 16/201,838

(22) Filed: Nov. 27, 2018

(65) Prior Publication Data

US 2019/0370124 A1 Dec. 5, 2019

Related U.S. Application Data

(60) Provisional application No. 62/591,108, filed on Nov. 27, 2017.

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 2009/45583* (2013.01); *G06F 2201/84* (2013.01)

(58) Field of Classification Search
CPC ............ G06F 11/1469; G06F 9/45558; G06F 2009/45583; G06F 2201/84
(Continued)

(56) References Cited

U.S. PATENT DOCUMENTS 8,549,518 B1  10/2013  Aron et al.
8,601,473 B1  12/2013  Aron et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Hosain T Alam
*Assistant Examiner* — Saba Ahmed
(74) *Attorney, Agent, or Firm* — Vista IP Law Group, LLP

(57) ABSTRACT

Systems for application configuration backup and restore. Techniques establish high frequency restore points of application configuration metadata. Processing commences upon receiving instructions to periodically take snapshots of application configuration metadata. To avoid incurring unnecessary costs to process snapshots of application configuration metadata when the application configuration metadata is slow-changing, the method performs a low-cost check to get the latest update time of the application configuration metadata. That time is compared to the time of the most recent snapshot of the application configuration metadata. When the time of the latest update time of the application configuration metadata is equal to the time of the most recent snapshot of the application configuration metadata, then rather than incurring the cost of generating a duplicate snapshot, the method waits for a duration without generating a new snapshot. High frequency restore points for application configuration metadata are emulated by pointing to corresponding lower frequency snapshots.

27 Claims, 12 Drawing Sheets

(58) Field of Classification Search
USPC ............................................. 707/649
See application file for complete search history.

(56) References Cited

U.S. PATENT DOCUMENTS

| | | | |
|---|---|---|---|
| 8,676,762 B2 | 3/2014 | Pafumi et al. | |
| 8,850,130 B1 | 9/2014 | Aron et al. | |
| 9,613,064 B1* | 4/2017 | Chou | G06F 16/182 |
| 9,772,866 B1 | 9/2017 | Aron et al. | |
| 9,824,095 B1* | 11/2017 | Taylor | G06F 16/11 |
| 2013/0111262 A1* | 5/2013 | Taylor | G06F 11/2089 |
| | | | 714/4.11 |
| 2014/0006357 A1* | 1/2014 | Davis | G06F 11/1446 |
| | | | 707/667 |
| 2014/0279900 A1* | 9/2014 | Gupta | G06F 16/219 |
| | | | 707/634 |
| 2016/0132400 A1* | 5/2016 | Pawar | G06F 16/258 |
| | | | 707/679 |
| 2016/0210197 A1 | 7/2016 | Guthrie et al. | |
| 2019/0034294 A1* | 1/2019 | Tirado | G06F 11/1448 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Davis, David. "Building an empire around the free VMware hypervisor" (Jun. 10, 2013), 2 pages.
Rouse, Margaret. "VMware snapshot" (Dec. 2012), WhatIs.com, 2 pages.
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Cano, I. et al., "Curator: Self-Managing Storage for Enterprise Clusters", *14th USENIX Symposium on Networked Systems Design and Implementation, NSDI '17*, (Mar. 27, 2017).

\* cited by examiner

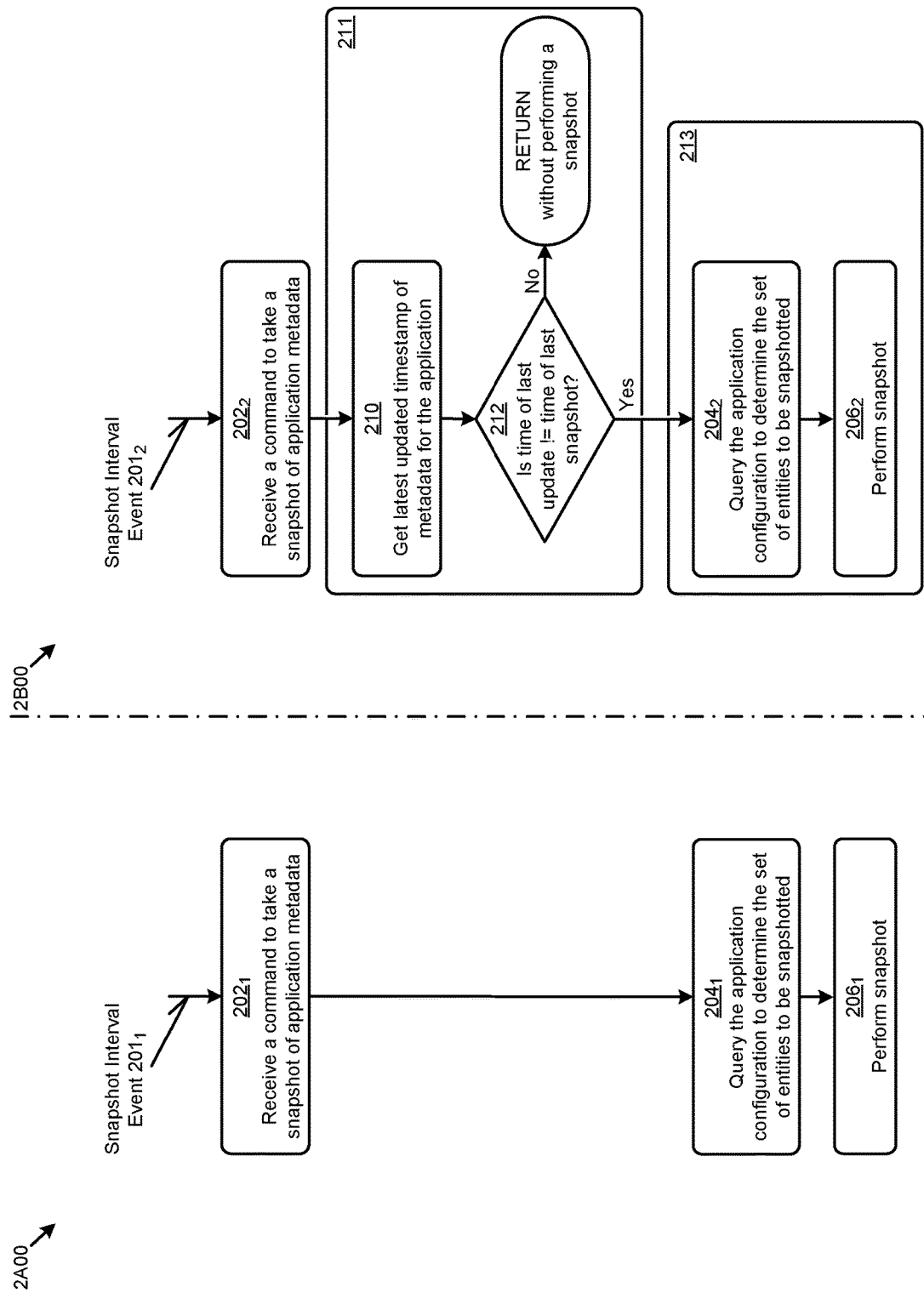

HIGH-FREQUENCY VIRTUAL MACHINE RESTORE POINTS

RELATED APPLICATIONS

The present application claims the benefit of priority to U.S. Patent Application Ser. No. 62/591,108 titled "HIGH-FREQUENCY VIRTUAL MACHINE RESTORE POINTS", filed on Nov. 27, 2017, which is hereby incorporated by reference in its entirety.

FIELD

This disclosure relates to computing cluster data management, and more particularly to techniques for forming and managing high-frequency application configuration restore points.

BACKGROUND

Modern computing systems exhibit fast-changing data (e.g., disk drive data). As the value of such data goes up (e.g., due to ever more and more transactions being performed per hour, etc.), administrators of such modern computing systems continually demand for near-zero loss of data, even in the event of a disaster. Administrators have long sought to identify mechanisms to be able to restore data that is "up-to-the-minute" when a disaster or failure had occurred. One way to be able to restore data that is "up-to-the-minute" is to take snapshots very frequently such that a system can be recovered from combinations of snapshots and other backed-up data that combine to form an "up-to-the-minute" restore point.

Restoring a system after the event of a disaster or other failure had occurred includes restoring system data such as folders, files, databases, etc., as well as restoring the computing state of the system to the restore point just previous to the disaster or other failure. In many modern computing systems, the aforementioned computing state is substantially described by a listing of any/all of the system processes and/or application processes that were executing in the computing system at the time of the disaster or failure.

Accordingly, the contents of the snapshots have evolved to include both system data and computing state configurations. However, although it is common that system data (e.g., folders, files, databases, etc.) undergoes changes quite rapidly and is thus often subjected to very frequent snapshotting, the computing state configurations change much less rapidly. For example, an application "A" might run in an initial configuration for a period of time from T1 to T2, and during this time, application "A" makes millions of changes to thousands of transactions. At time T3 (T3>T2) the application "A" might make a configuration change, such to open a new communication channel. As can be seen from this example, the frequency of changes to data might be many orders of magnitude higher than the frequency of changes to the application's configuration.

Unfortunately, when taking high-frequency snapshots that serve as correspondingly high frequency restore points, the slow-changing application configurations are combined with the rapidly-changing system data. This results in unnecessary processing of application configuration data (e.g., unnecessary querying, unnecessary comparisons, redundant storage, etc.). What is needed is a way to avoid unnecessary processing of application configuration data, yet without giving up the advantages of having high-frequency restore points.

SUMMARY

The present disclosure describes techniques used in systems, methods, and in computer program products for managing high-frequency application configuration restore points, which techniques advance the relevant technologies to address technological issues with legacy approaches. More specifically, the present disclosure describes techniques used in systems, methods, and in computer program products for high-performance processing of virtual machine configuration data. Certain embodiments are directed to technological solutions for timestamping changes to application configuration metadata so as to eliminate processing costs associated with performing duplicative snapshot operations.

The disclosed embodiments modify and improve over legacy approaches. In particular, the herein-disclosed techniques provide technical solutions that address the technical problems attendant to taking application configuration snapshots less frequently, yet without the risk of losing application configuration data changes. Such technical solutions relate to improvements in computer functionality by reducing the frequency of taking application configuration snapshots whenever the application configuration snapshot would comprise a duplication of data of an earlier generated snapshot. As such, the various applications of the herein-disclosed improvements in computer functionality serve to reduce the demand for computer memory, reduce the demand for computer processing power, reduce network bandwidth use, and reduce the demand for inter-component communication, yet without risk of losing application configuration data changes. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of hyperconverged computing platform management as well as advances in various technical fields related to highly-efficient data storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 2A depicts a first snapshot handling technique.

FIG. 2B depicts a second snapshot handling technique that depicts computer processing savings that arise from reducing the frequency of taking application configuration snapshots, according to an embodiment.

DETAILED DESCRIPTION

Figure 1A:
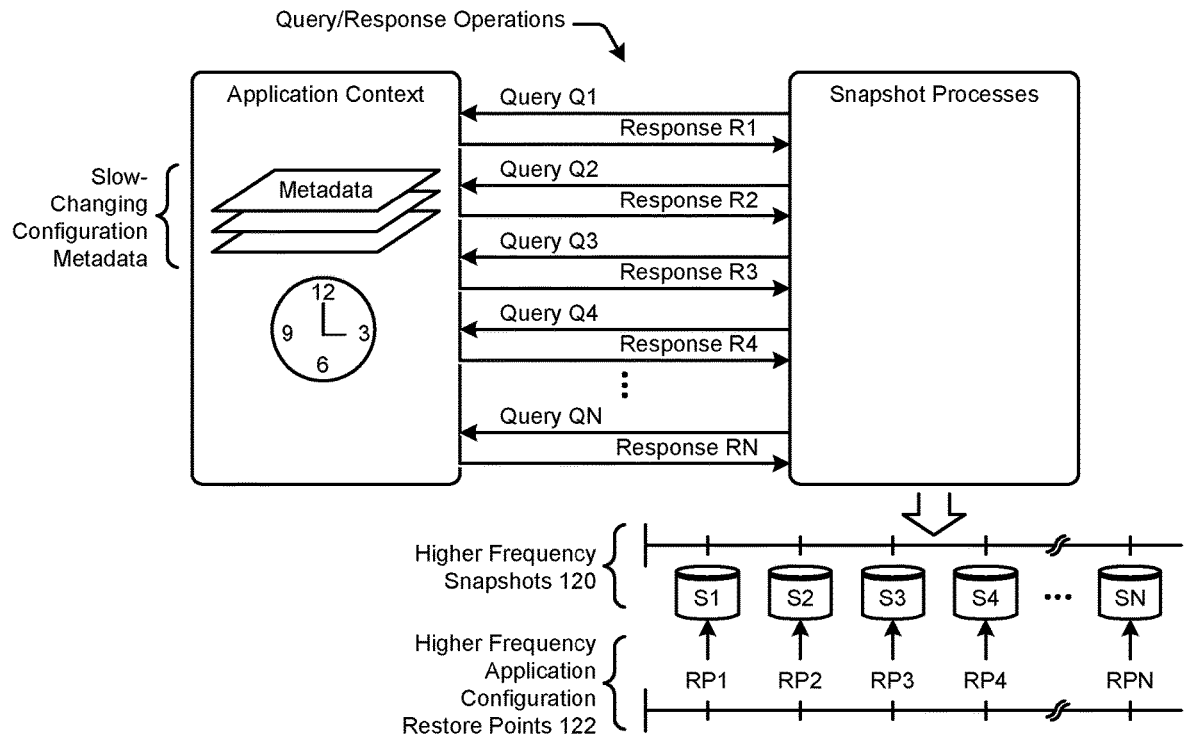
FIG. 1A and FIG. 1B are system diagrams that compare techniques for establishing restore points.

Embodiments in accordance with the present disclosure address the problem of reducing the frequency of taking application configuration snapshots without incurring additional risks of losing application configuration data changes. Some embodiments are directed to approaches for time-stamping changes to application configuration metadata so as to eliminate performance of duplicative snapshot operations. The accompanying figures and discussions herein present example environments, systems, methods, and computer program products for high-performance processing of virtual machine configuration data.

Overview

In many modern computing clusters, applications are implemented using one or more computing processes (e.g., virtual machines, executable containers, etc.), each of which processes are configured in accordance with the computing needs of the application. For example, in certain virtualization environments, an application might specify various virtualized resources such as virtual disks, virtual network connections, virtual memory, and/or other virtualized resources. In most situations, the state of such applications needs to be backed up or snapshotted periodically so as to be able to restore the system to a previous state (e.g., restore point) after the event of a disaster or other failure. In some situations, a requirement or constraint from a service level agreement (SLA) or other source of requirement or constraint might require that an application state must be able to be restored to a very recent moment in time (e.g., to a moment in time just before occurrence of a disaster event), so as to risk only a certain amount of lost time and data.

To be able to accomplish a restoration of a system to a very recent moment in time, backup systems capture system data and system configurations at a high frequency. As users demand higher and higher granularity of restore points, then the cost of querying the state of the application also increases.

In many situations, the period of time between making a backup copy or taking snapshots becomes very short—in some cases even shorter than the processing time needed for collecting and processing the application configuration state.

Disclosed herein are techniques for reducing the cost of collecting and processing the application configuration state without increasing the risk of losing application configuration data changes that are needed for highly-granular restore points.

More specifically, the disclosed techniques serve to avoid unnecessary collection of application configuration metadata. Strictly as one example, at the beginning of a time interval when a backup or snapshot is scheduled to occur, embodiments perform a check to see if there has been a change to the application configuration metadata since the last backup or snapshot had been performed. If there has not been a change to the application configuration metadata since the last backup or snapshot had been performed, the backup or snapshot processing for the current interval can be skipped, thus eliminating any occurrences of re-processing application configuration metadata that had already been backed-up or snapshotted.

Some embodiments comprise steps for capturing time-stamps (e.g., capturing a time or other indication of a sequence), and associating such timestamps to respective events that occur on application configuration metadata. As such, at any moment in time (e.g., at regular snapshotting intervals), a test can be performed to determine if the then-current application configuration metadata had been changed since the last successful save of the application configuration metadata. If there had not been a change to the then-current. On the other hand, if there had been a change to the then-current application configuration since the last successful save of the application configuration data, then steps for collecting application configuration data and then performing backup or snapshot operations to capture the changed application configuration data are carried out.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

Figure 1B:
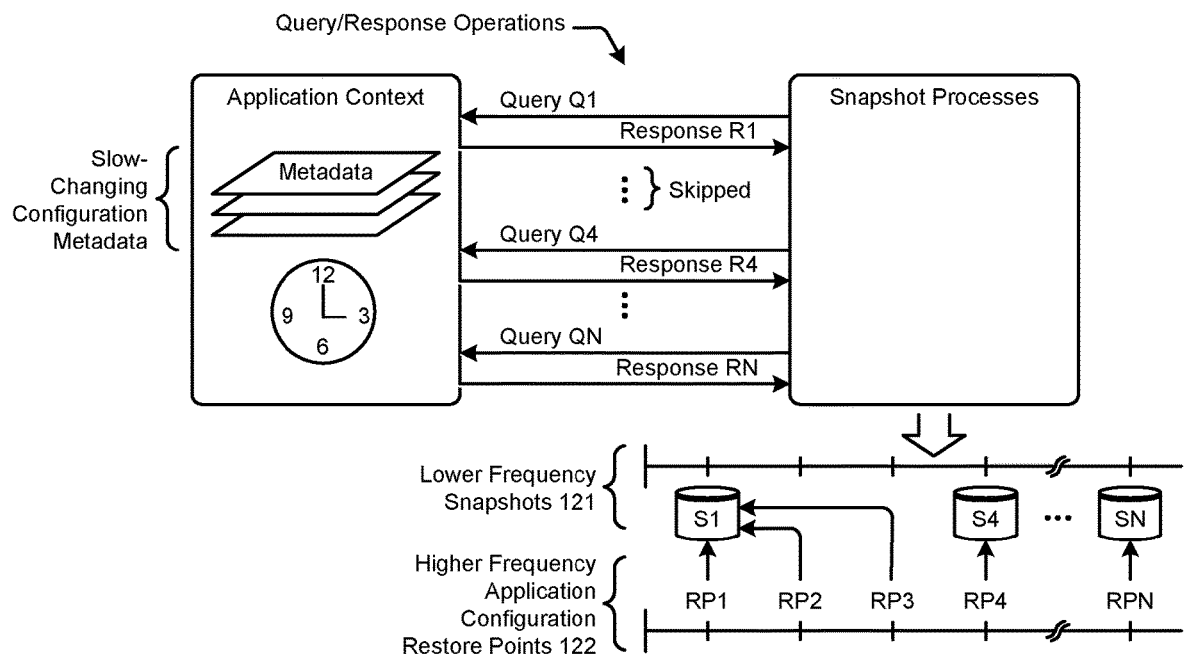

FIG. 1A and FIG. 1B are system diagrams that compare techniques for establishing restore points. The system of FIG. 1A depicts a technique for establishing high frequency application configuration restore points 122 from correspondingly high snapshots. The system of FIG. 1B depicts a technique for establishing high frequency application configuration restore points 122 from lower frequency snapshots 121, yet without any loss of changed configuration metadata.

In the system of FIG. 1A, high-frequency snapshots 120 (e.g., snapshot S1, snapshot S2, snapshot S3, snapshot S4, and snapshot SN are formed to include application context metadata. Such application context metadata is given in responses to one or more queries issued by snapshot processes. Specifically, and as shown, the snapshot processes of FIG. 1A repeatedly issues queries (e.g., application context query Q1, application context query Q2, application context query Q3, application context query Q4, and application context query QN) to an application context so as to receive corresponding application configuration metadata in the form of query responses (e.g., response R1, response R2, response R3, response R4, and response RN). The contents of the query responses include the requested application configuration metadata, which is in turn are saved to system snapshots (e.g., snapshot S1, snapshot S2, snapshot S3, snapshot S4, and snapshot SN) that comprise a combination of system data, storage data, application data, and any other data needed for restoration in the event of a disaster or other recovery situation. Each of the snapshots of the shown high-frequency snapshots 120 correspond to respective higher frequency application configuration restore points 122 (e.g., restore point RP1, restore point RP2, restore point RP3, restore point RP4, and restore point RPN). As such, the system can be restored to a high degree of timing-wise granularity by using a selected one of the application configuration restore points.

However, in some situations, the application context undergoes only infrequent changes relative to other data of the overall system. This then brings to bear the situation where many of the frequent query/response transactions are unnecessary since the application configuration metadata is not changing as fast as the other data of the system, and thus, it becomes redundant to make a query, then process the corresponding query response, and then save the application configuration metadata to a snapshot.

FIG. 1B depicts an improved approach, to avoid frequently incurring the expense of collecting application metadata when the application context exhibits only infrequent changes to the application configuration metadata. Specifically, during certain periods of time when the application configuration metadata is not changing rapidly, the query/response/snapshot steps can be "skipped" (as shown). Since, during such periods, the application configuration metadata is not changing, a previous capture of the application configuration metadata can be used. This is shown in the bottom portion of FIG. 1B. Specifically, the same higher frequency application configuration restore points 122 (e.g., restore point RP1, restore point RP2, restore point RP3, restore point RP4, and restore point RPN) are available, however some of the restore points (e.g., restore point RP2 and restore point RP3) merely refer to an earlier snapshot (e.g., snapshot S1). As such, a high-frequency application configuration restore points are efficiently emulated since higher frequency application configuration restore points 122 merely refer to a lower frequency snapshots 121. Correspondence between higher frequency application configuration restore points 122 and lower frequency snapshots 121 is given in Table 1 using the naming convention depicted in FIG. 1A and FIG. 1B.

TABLE 1

Restore point correspondence to snapshots

| High Frequency Restore Point | Referred-to Lower Frequency Snapshot |
| --- | --- |
| RP1 | S1 |
| RP2 | S1 (not S2) |
| RP3 | S1 (not S3) |
| RP4 | S4 |
| RPN | SN |

In some embodiments, the relationship between a particular (emulated) high frequency application configuration metadata restore point and its corresponding lower frequency snapshot can be captured in a data structure such as a table. In some embodiments, the relationship can be time-oriented. For example, rather than use a table or other data structure to correlate between an application configuration metadata restore point and its corresponding lower frequency snapshot, the most recent lower frequency snapshot that was taken at a time before the time of the desired (emulated) high frequency application configuration metadata restore point is identified.

As earlier indicated, the cost of querying an application or its agents (e.g., hypervisor) to collect application configuration metadata can be costly. This is because application configuration metadata is often extensive, at least in that application configuration metadata is a full set of parameters and their values that describe a hierarchy of virtualized entities, including aspects of (1) how the virtualized entities are provisioned, (2) how the virtualized entities are related to and/or (3) how particular ones of the virtualized entities interact with other virtualized entities. The following FIG. 1C depicts cost savings that can be garnered by reducing the frequency of taking application configuration snapshots.

Figures 1C, 1D:
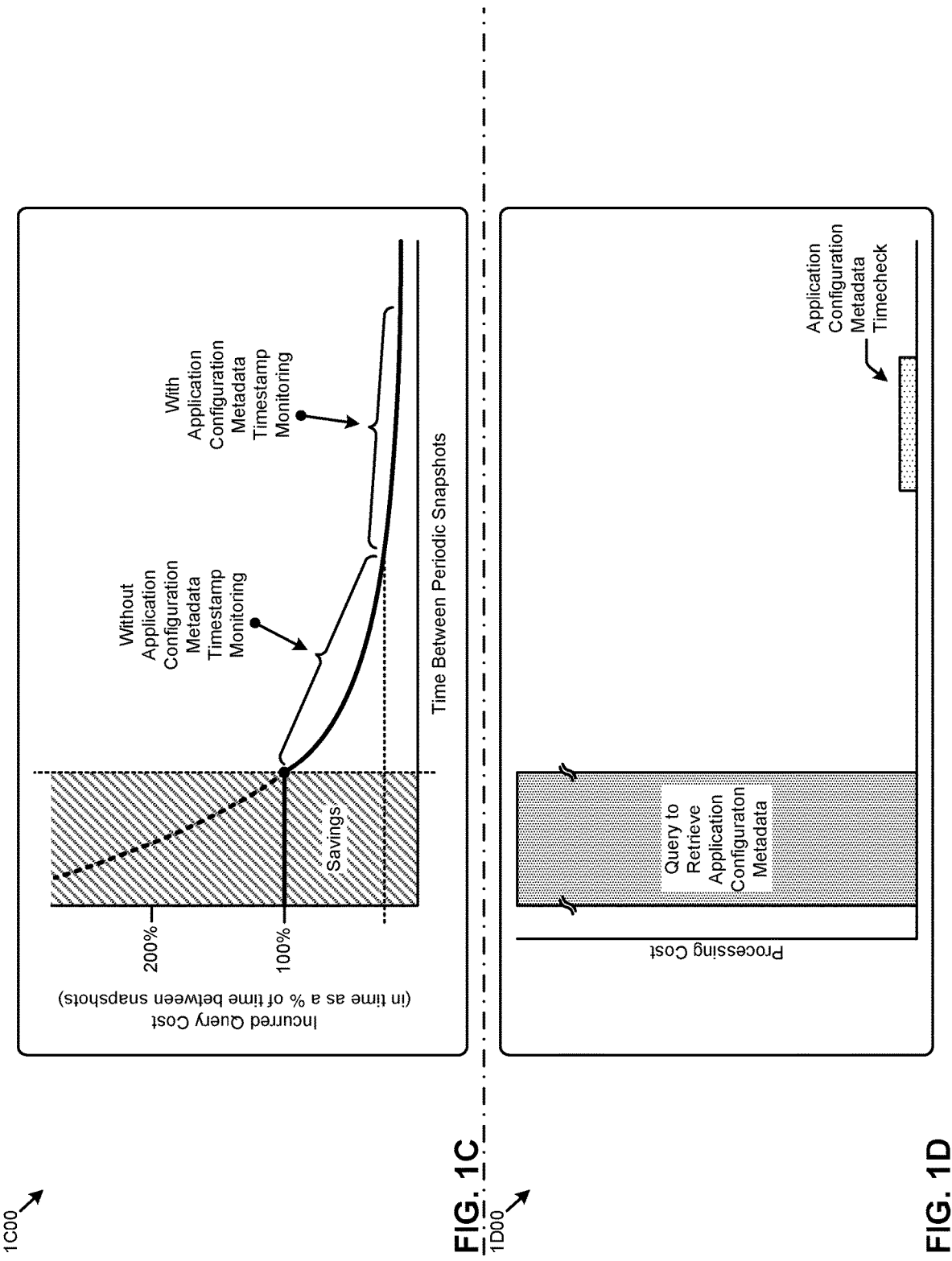
FIG. 1C is processing cost savings chart that depicts cost savings that arise from reducing the frequency of taking application configuration snapshots.
FIG. 1D is a comparison chart that plots relative costs incurred by a query to retrieve an application configuration as compared to costs incurred by performing a monitoring timecheck.

FIG. 1C is processing cost savings chart 1C00 that depicts cost savings that arise from reducing the frequency of taking application configuration snapshots. There is a processing cost associated with querying the system for collection of such application configuration metadata. The processing cost savings chart 1C00 depicts such costs in the ordinate as, "Incurred Query Costs". The abscissa charts time between periodic snapshots. As the time between periodic snapshots decreases (e.g., going toward the left of the abscissa), the incurred processing costs increases.

In certain situations, the time between periodic snapshot is relatively larger than the time to perform the aforementioned query, thus, the time needed to perform a query was relatively small as compared to the period of between snapshot operations. However, in modern computing settings, many applications are of a nature that they need to be backed-up or snapshotted frequently so as to avoid or eliminate the risk of lost data or user frustration resulting from lost productivity. To explain, if a system naively assumes that application configuration metadata changes as fast as other data of the system that system would repeatedly incur the costs associated with collecting application configuration metadata—thus repeatedly incurring costs needlessly.

The processing cost savings chart depicts one possible approach to eliminating unnecessary and recurring processing costs associated with collecting application configuration metadata. Specifically, the chart depicts a possible cost savings when implementing an application configuration metadata timecheck.

The techniques disclosed herein serve to eliminate performance of application configuration metadata backup operations when there are no changes to the application configuration metadata since the last backup of the application configuration metadata.

FIG. 1D is a comparison chart 1D00 that plots relative costs incurred by a query to retrieve an application configuration as compared to costs incurred by performing a monitoring timecheck. As shown, the processing costs incurred by a query to retrieve application configuration metadata is much higher than the processing costs incurred by merely an application configuration metadata timecheck.

FIG. 2A depicts a first snapshot handling technique 2A00. As an option, one or more variations of snapshot handling technique 2A00 or any aspect thereof may be implemented in the context of the architecture and functionality of the embodiments described herein. The snapshot handling technique 2A00 or any aspect thereof may be implemented in any environment.

The embodiment shown in FIG. 2A is merely one example. As shown, upon a snapshot interval event 201$_1$, step 202$_1$ serves to receive a command to take a snapshot of the application configuration metadata. At step 204$_1$, an agent performs a query to determine the set of entities to be snapshotted. Step 206$_1$ then serves to persist the application configuration metadata for each of the entities to be snapshotted (e.g., by generating a snapshot).

In some cases, application configuration metadata for each of the entities to be snapshotted in an $(N+1)^{th}$ snapshot cycle is the same application configuration metadata for each of the entities to be snapshotted as had been captured in an $M^{th}$ cycle (where $M \leq N$). Such a technique can be improved, such as is shown and described in FIG. 2B.

FIG. 2B depicts a second snapshot handling technique 2B00 that depicts computer processing savings that arise from reducing the frequency of taking application configuration snapshots. As an option, one or more variations of snapshot handling technique 2B00 or any aspect thereof may be implemented in the context of the architecture and functionality of the embodiments described herein. The snapshot handling technique 2B00 or any aspect thereof may be implemented in any environment.

The embodiment shown in FIG. 2B is merely one example. As shown, upon a snapshot interval event 201$_2$, step 202$_2$ serves to receive a command to take a snapshot of the application configuration metadata. The snapshot handling technique 2B00 includes operation 211 that serves to eliminate performance of duplicative snapshot operations. The actions that make up operations 211 serve to retrieve timestamps that are associated respectively to (a) the time or sequence ID of the latest updated application configuration metadata, and (b) the time or sequence ID of the last persisted snapshot of the application configuration metadata. Specifically, at step 210, a timecheck request operation is performed such that the time or sequence ID of the latest updated application configuration metadata is retrieved. At decision 212, the timecheck value is compared with the time or sequence ID of the last persisted snapshot of the application configuration metadata.

If the times or sequence IDs are determined to be different (corresponding to the "Yes" path of decision 212), then the processing flow proceeds to query/snapshot procedure 213, where a snapshot is generated. More specifically, an agent that performs step 204$_2$, invokes one or more queries to determine the set of entities to be snapshotted. Step 206$_2$ initiates snapshot activities that serve to persist the application configuration metadata for each of the entities to be snapshotted. Otherwise, if the times or sequence IDs are the same (corresponding to the "No" path of decision 212), then the snapshot of the application configuration metadata for that interval is suppressed such that a snapshot for that interval is not generated.

Capturing the time or sequence ID of the latest updated application configuration metadata can be performed in one or more operations that can occur asynchronously with the steps of snapshot handling technique 2B00. One possibility for capturing the time or sequence ID of the latest updated application configuration metadata is shown and described as pertains to FIG. 2C.

Figure 2C:
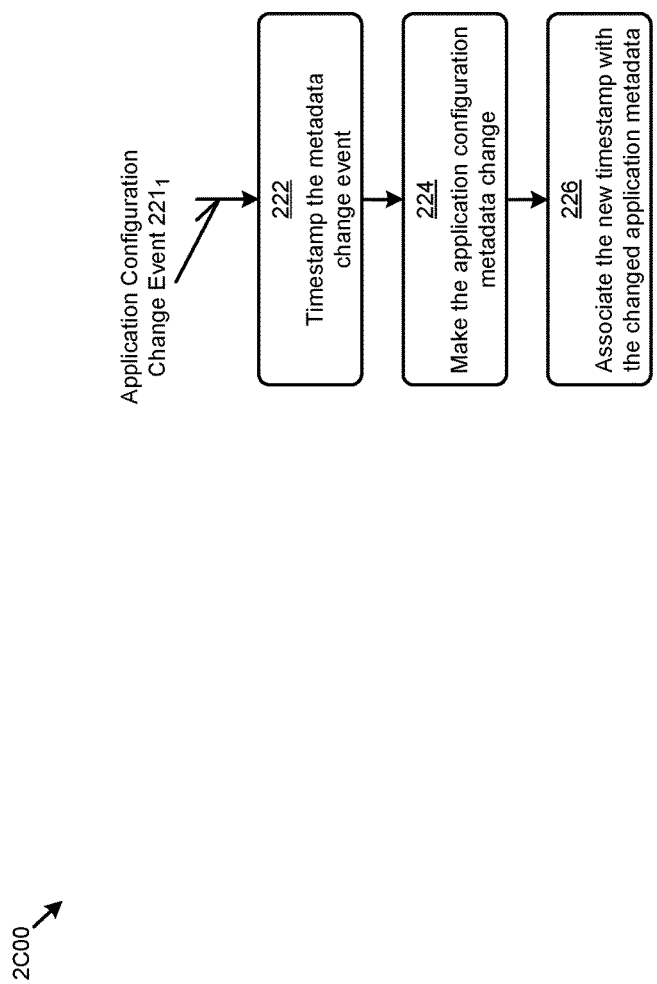
FIG. 2C depicts an asynchronous snapshot change detection technique that is used for reducing the frequency of taking application configuration snapshots without increasing the risk of losing application configuration data changes, according to some embodiments.

FIG. 2C depicts an asynchronous snapshot change detection technique 2C00 that is used for reducing the frequency of taking application configuration snapshots without increasing the risk of losing application configuration data changes. As an option, one or more variations of snapshot change detection technique 2C00 or any aspect thereof may be implemented in the context of the architecture and functionality of the embodiments described herein. The snapshot change detection technique 2C00 or any aspect thereof may be implemented in any environment.

The embodiment shown in FIG. 2C is merely one example. As shown, step 222 is entered upon detection of an application configuration change event 221$_1$. A timestamp is generated and/or a sequence ID is generated. At step 224, the application configuration metadata is changed in accordance with the nature of application configuration change event 221$_1$ and, at step 226, an association is made between the timestamp or sequence ID and the changed application configuration data.

Figure 3:
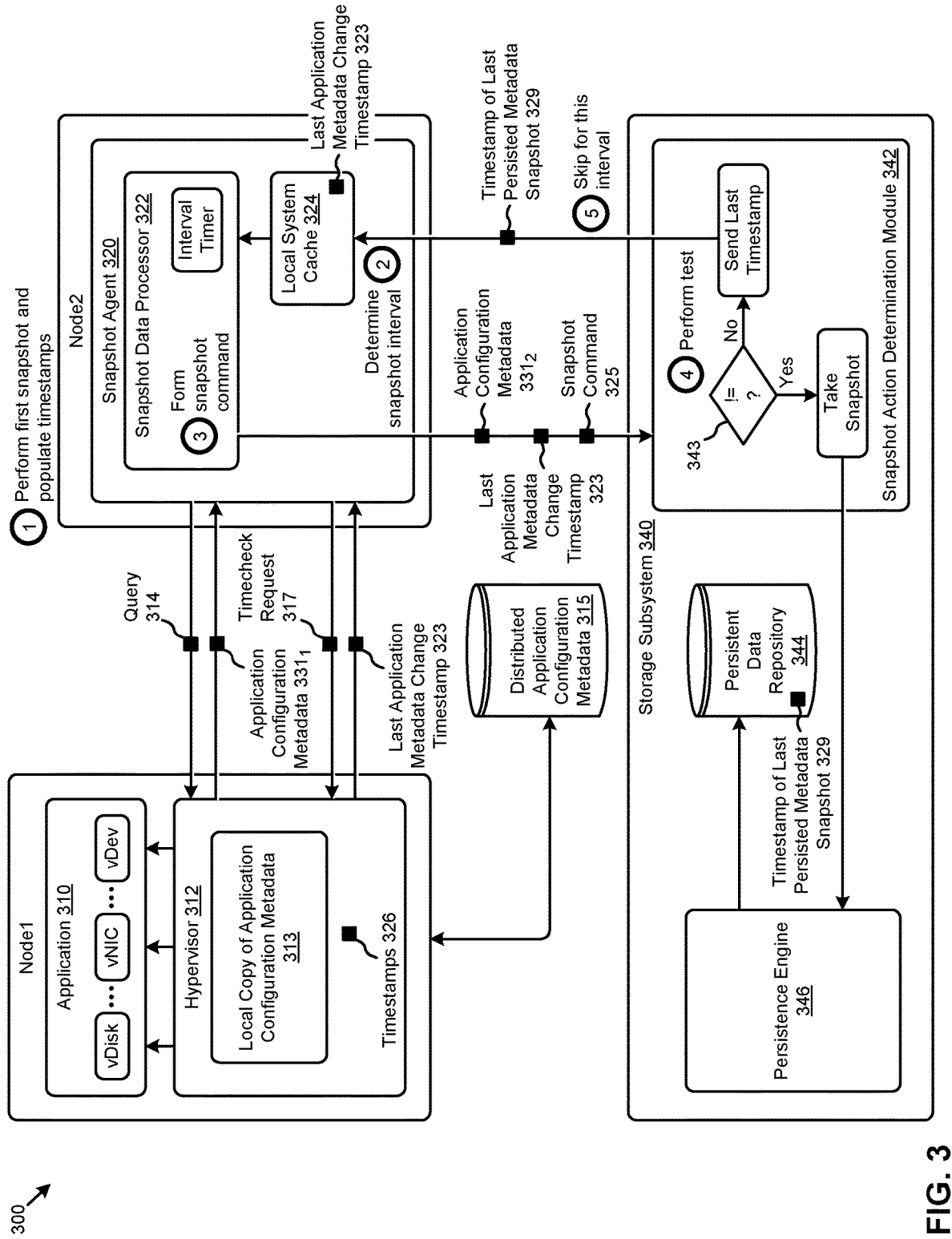
FIG. 3 presents a block diagram of a system for reducing the frequency of taking application configuration snapshots without increasing the risk of losing application configuration data changes, according to some embodiments.

Any one or all of the flows of FIG. 2A and/or FIG. 2B and/or FIG. 2C can be implemented in a system such as is depicted in FIG. 3.

FIG. 3 presents a block diagram of a system 300 for reducing the frequency of taking application configuration snapshots without increasing the risk of losing application configuration data changes. As an option, one or more variations of system 300 or any aspect thereof may be implemented in the context of the architecture and functionality of the embodiments described herein. The system 300 or any aspect thereof may be implemented in any environment.

The embodiment shown in FIG. 3 is merely one example. As shown, the system depicts a first computing node shown as "Node1", a second computing node shown as "Node2", and a storage subsystem 340. Node1 comprises application 310, which application 310 might be implemented in one or more virtual machines and/or executable containers. Any application can allocate virtual entities (e.g., a virtual disk, "vDisk", a virtual network interface capability "vNIC", and/or other virtual devices). As shown, a hypervisor 312 serves to respond to application requests to allocate and operate virtual entities. In the particular embodiment shown, the hypervisor manages a local copy of the application configuration metadata 313 and corresponding timestamps 326. Timestamps correspond to any change of any aspect of the application configuration metadata 313. As shown, the hypervisor is operable to send a copy of the application configuration metadata (e.g., the then-current application configuration metadata 3311) to the snapshot agent (e.g., in response to a query 314). Also, the hypervisor is operable to send metadata change indications (e.g., a last application metadata change timestamp 323) to the snapshot agent. The hypervisor or snapshot agent can send metadata change indications autonomously, or the metadata change indications can be performed in response to a timecheck request (e.g., in response to the shown timecheck request 317).

In some situations, there might be any number of virtual entities that are managed in whole or in part by any number of nodes. In such cases, the application configuration metadata might be composed in whole or in part within a set of distributed application configuration metadata 315. Such a repository can be stored anywhere in the computing system, possibly in a different cluster. Furthermore, the last application metadata change timestamp 323 can be stored anywhere in the computing system.

Continuing with the discussion of system 300, the shown "Node2" hosts a snapshot data processor 322. An initial snapshot or other form of a backup copy of the application configuration metadata is made (operation 1). Then, on a periodic basis such as based on an interval timer (operation 2), the snapshot agent 320 forms a snapshot command (operation 3) that is sent to storage subsystem 340 in accordance with a snapshot initiation protocol whereby the storage subsystem perform a test (operation 4) to determine if the then-current instance of application configuration metadata 3312 has been changed since the last successful snapshot of the application configuration metadata. Depending on the results of the test, the storage subsystem might decline to perform the unnecessary snapshot (operation 5), and instead, complete the protocol by sending a timestamp of the last persisted metadata snapshot or backup.

This is merely one partitioning. If, at test 343 it is determined that the then-current instance of application configuration metadata 3312 has been changed since the last successful save of the application configuration metadata, then the storage system performs steps to persist the then-current instance of application configuration metadata 3312 through persistence engine 346.

The test 343 can be performed in physical locations or in logical partitions other than in the storage subsystem. In the embodiment shown in FIG. 3, however, the test is performed in a snapshot action determination module 342 that is deployed as an operational element of the storage subsystem.

In some embodiments, if it is determined that the then-current application configuration metadata had been changed since the last successful save of the application configuration metadata, the snapshot agent sends a query 314 to hypervisor 312, which in turn sends a message comprising the then-current application configuration metadata 3311 and a last application metadata change timestamp 323 to the snapshot agent.

Figure 4:
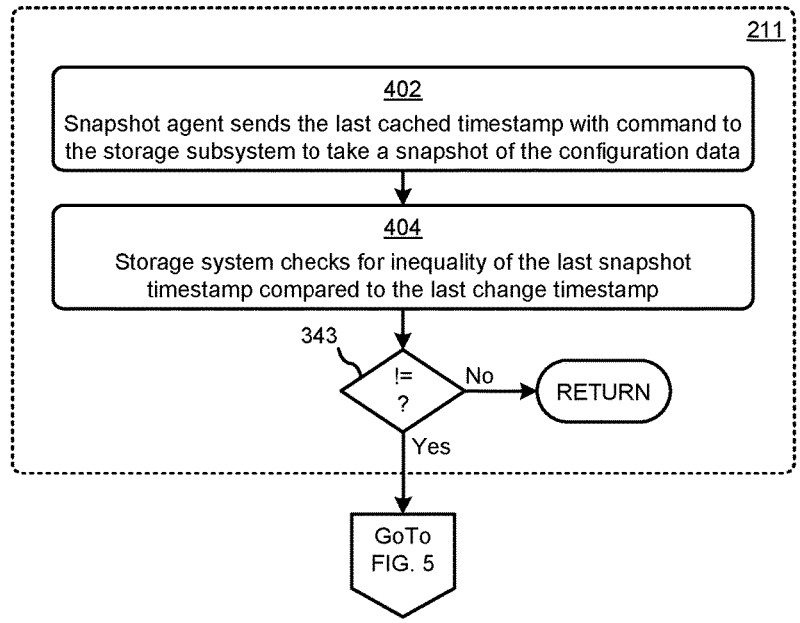
FIG. 4 is a flowchart showing a comparison technique that is used for reducing the frequency of taking application configuration snapshots, according to some embodiments.

FIG. 4 is a flowchart showing a comparison technique 400 that is used for reducing the frequency of taking application configuration snapshots. As an option, one or more variations of comparison technique 400 or any aspect thereof may be implemented in the context of the architecture and functionality of the embodiments described herein. The comparison technique 400 or any aspect thereof may be implemented in any environment.

The operations 211 can be implemented in a variety of ways. In the embodiment shown in FIG. 4, the test 343 is performed after collecting a time indication such as a timestamp or sequence number. In this embodiment, at step 402, the snapshot agent forms snapshot command instructions that includes the last time indication of the application configuration data (e.g., as might be retrieved from a local system cache 324 of the snapshot agent). The storage system responds to the command by performing test 343 that checks for equality/inequality (step 404) between the last timestamp or sequence number of the application configuration data as was provided in, or with snapshot command 325 and the timestamp or sequence number of the last persisted snapshot. If test 343 determines that there is no difference between the timestamp or sequence number of the application configuration data as was provided in the snapshot command, then the test 343 takes the "No" branch and a "No" indication will be returned to the caller to signal that the backup or snapshot can be skipped for this interval. In example cases of the "No" branch, the storage subsystem will send a timestamp or sequence number pertaining to the last completed application configuration metadata snapshot. Otherwise, if there is a difference between the timestamp or sequence number of the application configuration data as was provided in the snapshot command and the timestamp or sequence number of the last persisted snapshot, then the test 343 takes the "Yes" branch is taken and an indication will be returned to the caller to signal that the backup or snapshot of the application configuration data will be initiated for this interval.

Figure 5:
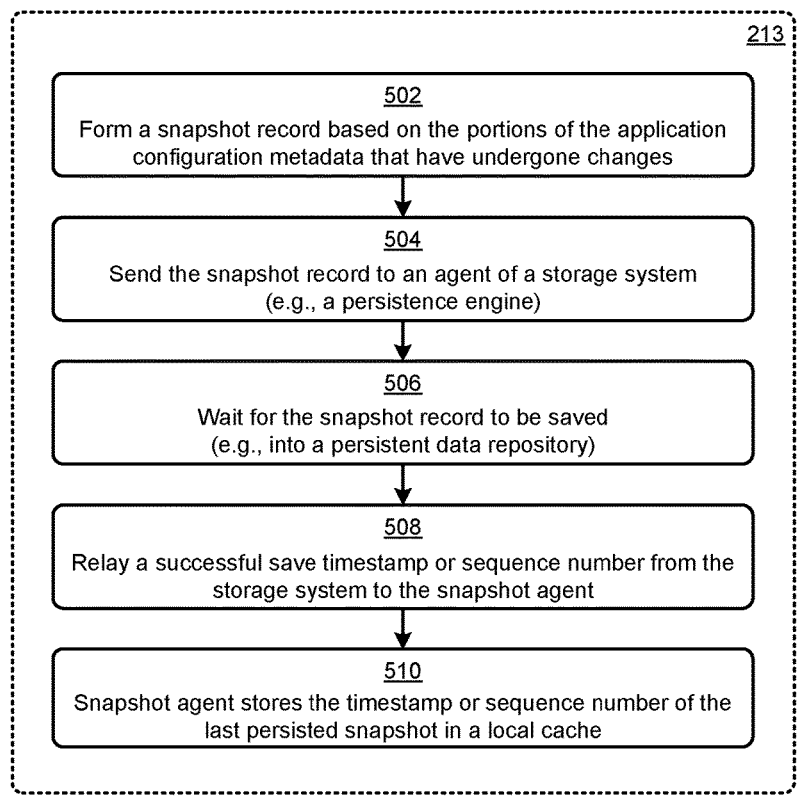
FIG. 5 is a flowchart showing a snapshot persistence technique that is used in systems that reduce the frequency of taking application configuration snapshots without incurring corresponding risks of losing application configuration data changes, according to some embodiments.

FIG. 5 is a flowchart showing a snapshot persistence technique 500 that is used in systems that reduce the frequency of taking application configuration snapshots without incurring corresponding risks of losing application configuration data changes. As an option, one or more variations of snapshot persistence technique 500 or any aspect thereof may be implemented in the context of the architecture and functionality of the embodiments described herein. The snapshot persistence technique 500 or any aspect thereof may be implemented in any environment.

The embodiment shown in FIG. 5 is merely one example implementation involving the query of query/snapshot procedure 213. As shown, snapshot persistence technique 500 begins when the storage system determines that the changes to the application configuration metadata is to be persisted. A snapshot is formed based on the portions of the application configuration metadata that has changed (step 502). The storage subsystem persists the changed application configuration metadata (step 504). The application configuration metadata might be saved as a snapshot record that comprises only changes, or the application configuration metadata might be saved in its entirety. The act of saving includes storing to a persistent data repository 344. The persistence engine waits for the application configuration metadata to be saved into the persistent data repository (step 506) and, upon successful storage of the application configuration metadata into the persistent data repository, the storage subsystem saves an indication of success as a sequence number or timestamp of last persisted metadata snapshot 329. In some embodiments, the storage system relays the sequence number or timestamp of last persisted metadata snapshot 329 to the snapshot agent (step 508), and the snapshot agent stores the sequence number or timestamp of the last persisted metadata snapshot in a local cache (step 510).

Figure 6:
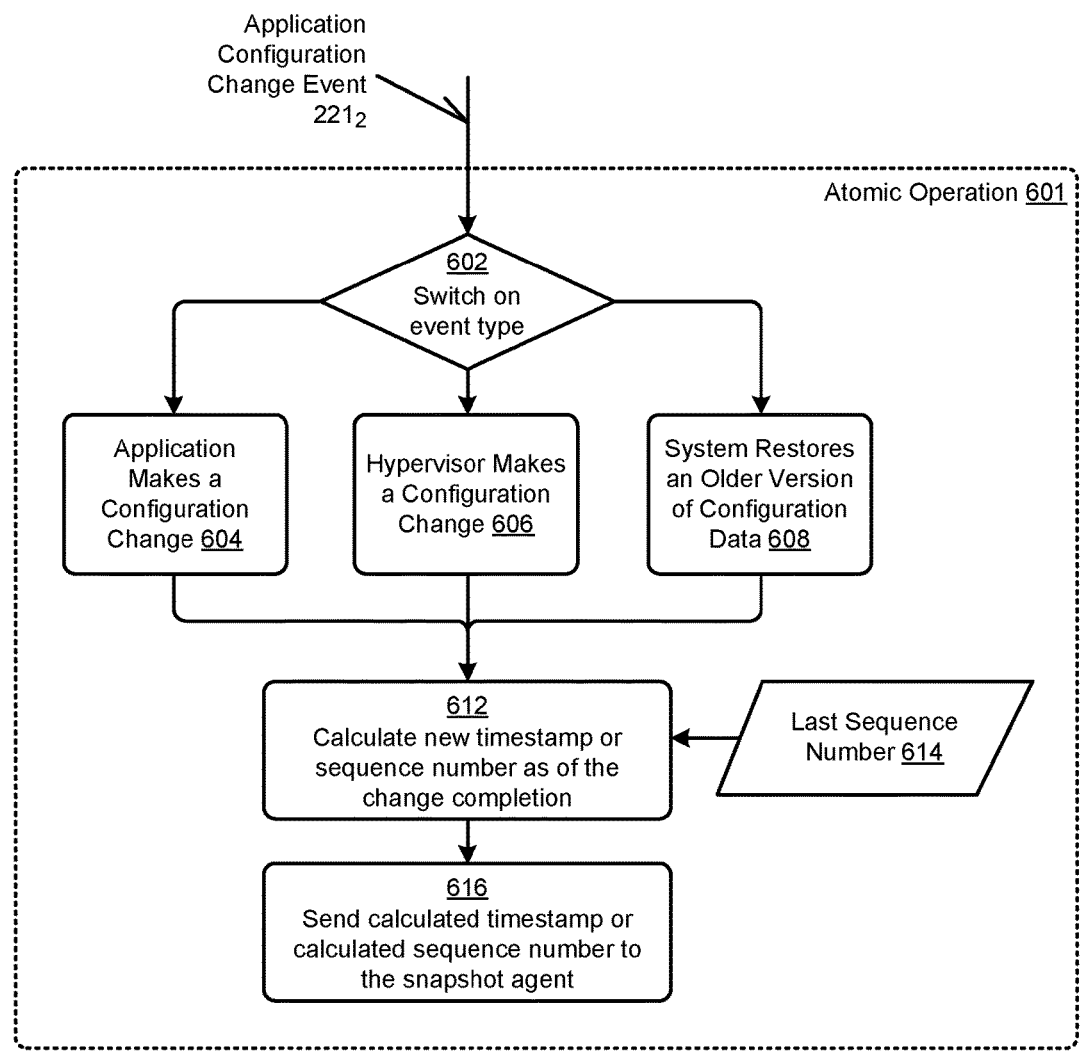
FIG. 6 is a flowchart showing an atomic configuration metadata change operation that is used in systems that reduce the frequency of taking application configuration snapshots without losing application configuration data changes, according to some embodiments.

FIG. 6 is a flowchart showing an atomic configuration metadata change operation 600 that is used in systems that reduce the frequency of taking application configuration snapshots without losing application configuration data changes. As an option, one or more variations of atomic configuration metadata change operation 600 or any aspect thereof may be implemented in the context of the architecture and functionality of the embodiments described herein. The atomic configuration metadata change operation 600 or any aspect thereof may be implemented in any environment.

The embodiment shown in FIG. 6 is merely one example. As shown, the atomic configuration metadata change operation is invoked upon an application configuration change event 221$_2$. Such an application configuration change event can be raised by any operational unit in the computing environment. The nature of a received application configuration change event can be determined by any known technique. At switch 602, the occurrence of the event and any corresponding application metadata to be changed is routed to a receiving unit. As shown, one receiving unit might be selected if the application itself makes a configuration change such as adding a vDisk (at step 604), or a different receiving unit might be selected if the hypervisor itself makes a configuration change (at step 606), or yet a different receiving unit might be selected if the application configuration change results from a system restore of an older version of the configuration data (at step 608).

When the change is deemed to have been made, atomic operation 601 calculates a new timestamp or sequence number as of the change completion (step 612). In the case of a sequence number or otherwise formatted sequence ID, a last sequence number 614 might be consulted. At step 616, the calculated timestamp or calculated sequence number is sent to the snapshot agent. The snapshot agent records this calculated timestamp or calculated sequence number.

Figure 7:
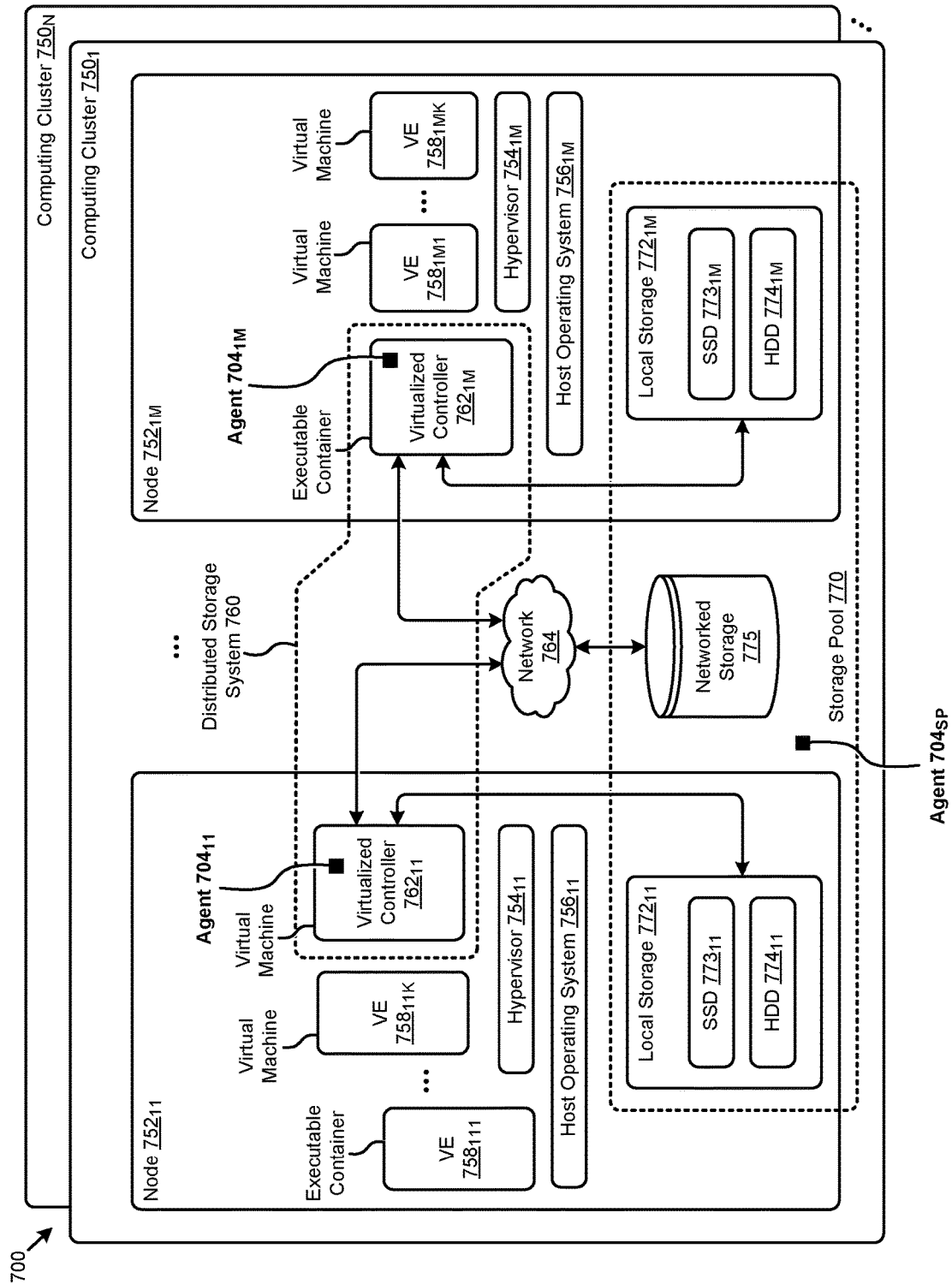
FIG. 7 is a block diagram of a distributed virtualization environment that implements agents for reducing the frequency of taking application configuration snapshots without losing application configuration data changes, according to some embodiments.

FIG. 7 is a block diagram of a distributed virtualization system 700 that implements agents for reducing the frequency of taking application configuration snapshots without losing application configuration data changes. As an option, one or more variations of distributed virtualization system 700 or any aspect thereof may be implemented in the context of the architecture and functionality of the embodiments described herein. The distributed virtualization system 700 or any aspect thereof may be implemented in any environment.

The embodiment shown in FIG. 7 is merely one example. The shown distributed virtualization environment depicts various components associated with one instance of a distributed virtualization system (e.g., hyperconverged distributed system) comprising a distributed storage system 760 that can be used to implement the herein disclosed techniques. Specifically, the distributed virtualization system 700 comprises multiple computing clusters (e.g., first computing cluster 750$_1$, . . . , second computing cluster 750$_N$), each computing cluster comprising multiple nodes that have multiple tiers of storage in a storage pool. Representative nodes (e.g., node 752$_{11}$, . . . , node 752$_{1M}$) and storage pool 770 associated with computing cluster 750$_1$ are shown. Each node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage 772$_{11}$, . . . , local storage 772$_{1M}$). For example, the local storage can be within or directly attached to a server and/or appliance associated with the nodes. Such local storage can include solid state drives (SSD 773$_{11}$, . . . , SSD 773$_{1M}$), hard disk drives (HDD 774$_{11}$, . . . , HDD 774$_{1M}$), and/or other storage devices.

As shown, the nodes in distributed virtualization system 700 can implement one or more user virtualized entities (e.g., VE 758$_{111}$, . . . , VE 758$_{11K}$, . . . , VE 758$_{1M1}$, . . . , VE 758$_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system 756$_{11}$, . . . , host operating system 756$_{1M}$), while the VMs run multiple applications on various respective guest operating systems. Such flexibility can be facilitated at least in part by a hypervisor (e.g., hypervisor 754$_{11}$, . . . , hypervisor 754$_{1M}$), which hypervisor is logically located between the various guest operating systems of the VMs and the host operating system of the physical infrastructure (e.g., node).

As an example, hypervisors can be implemented using virtualization software that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system 756$_{11}$, . . . , host operating system 756$_{1M}$) without, in most cases, a hypervisor layer. This lightweight implementation can facilitate efficient distribution of certain software components, such as applications or services (e.g., micro-services). As shown, distributed virtualization system 700 can implement both a hypervisor-assisted virtualization environment and a container virtualization environment for various purposes.

Distributed virtualization system 700 also comprises at least one instance of a virtualized controller to facilitate access to storage pool 770 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 760 which can, among other operations, manage the storage pool 770. This architecture further facilitates efficient scaling of the distributed virtualization system. The foregoing virtualized controllers can be implemented in distributed virtualization system 700 using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $752_{11}$ can interface with a controller virtual machine (e.g., virtualized controller $762_{11}$) through hypervisor $754_{11}$ to access the storage pool 770. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

Figure 8:
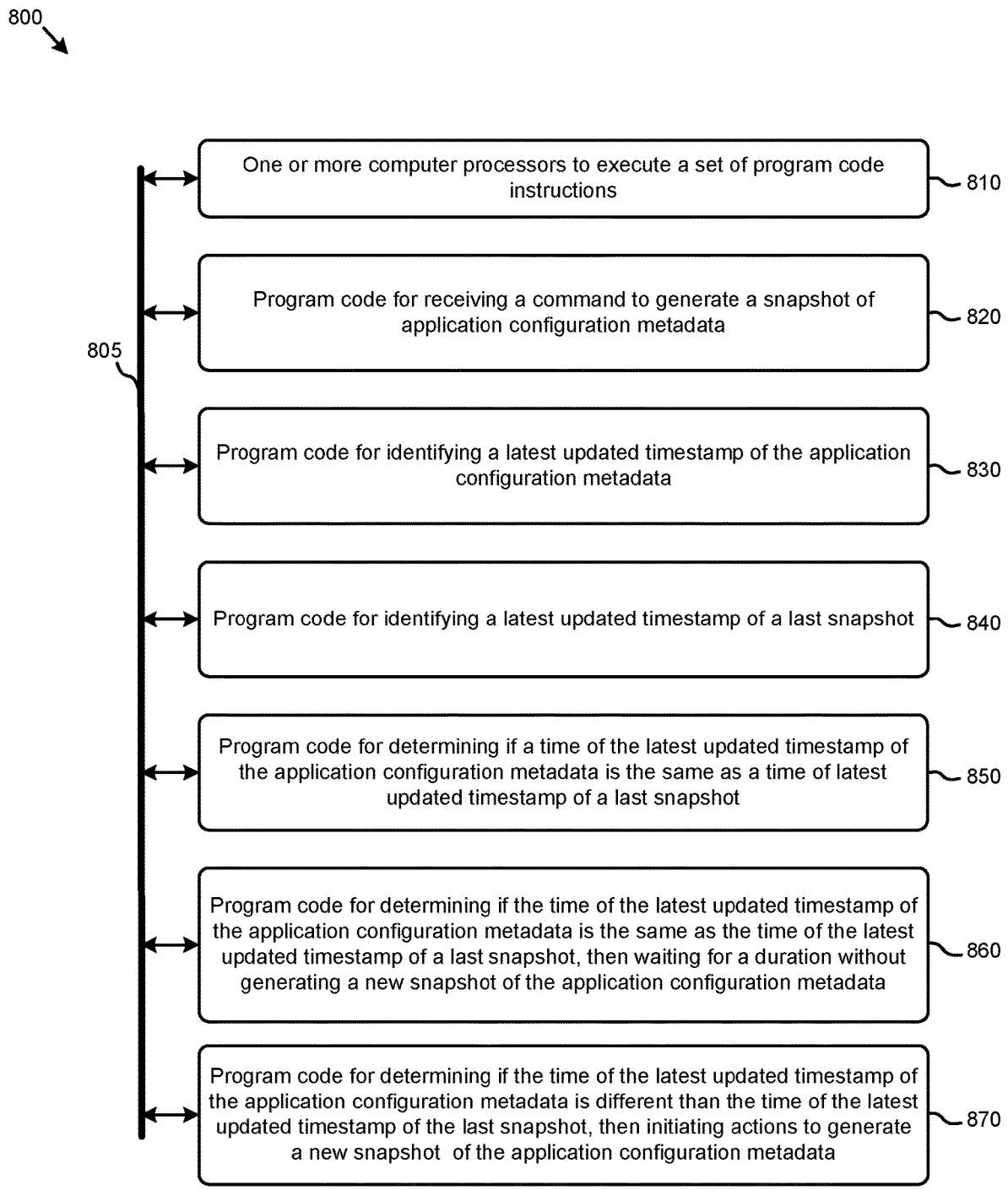
FIG. 8 depicts system components as arrangements of computing modules that are interconnected so as to implement certain of the herein-disclosed embodiments.

For example, a hypervisor at one node in the distributed storage system 760 might correspond to software from a first vendor, and a hypervisor at another node in the distributed storage system 760 might correspond to software from a second vendor. As another virtualized controller implementation example, containers (e.g., Docker containers) can be used to implement a virtualized controller (e.g., virtualized controller $762_{1M}$) in an operating system virtualization environment at a given node. In this case, for example, the virtualized entities at node $752_{1M}$ can access the storage pool 770 by interfacing with a controller container (e.g., virtualized controller $762_{1M}$) through hypervisor $754_{1M}$ and/or the kernel of host operating system $756_{1M}$. Agents (e.g., agent $704_{11}$, agent $704_{1M}$, and agent $704_{SP}$) are configured to operate within the environment to carry out the steps of the disclosed methods Additional Embodiments of the Disclosure Additional Practical Application Examples FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address reducing the frequency of taking application configuration snapshots without increasing the risk of losing application configuration data changes. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: receiving a command to generate a snapshot of application configuration metadata (module 820); identifying a latest updated metadata time indication (e.g., the latest updated timestamp of a last update of the application configuration metadata (module 830); identifying a latest metadata snapshot generation time indication (e.g., the latest updated timestamp of a last snapshot of the application configuration metadata) (module 840); determining if a time of the latest updated timestamp of the application configuration metadata is the same as a time of latest updated timestamp of a last snapshot of the application configuration metadata (module 850); determining if the time of the latest updated timestamp of the application metadata is the same as the time of the latest updated timestamp of the last snapshot, then waiting for a duration without generating a new snapshot of the application configuration metadata (module 860); and determining if the time of the latest updated timestamp of the application metadata is different than the time of the latest updated timestamp of the last snapshot, then initiating actions to generate a new, updated snapshot of the application configuration metadata (module 870).

Variations of the foregoing may include more or fewer of the shown modules. Certain variations may perform more or fewer (or different) steps, and/or certain variations may use data elements in more, or in fewer (or different) operations.

Still further, some embodiments include variations in the operations performed, and some embodiments include variations of aspects of the data elements used in the operations.

System Architecture Overview

Additional System Architecture Examples

Figure 9A:
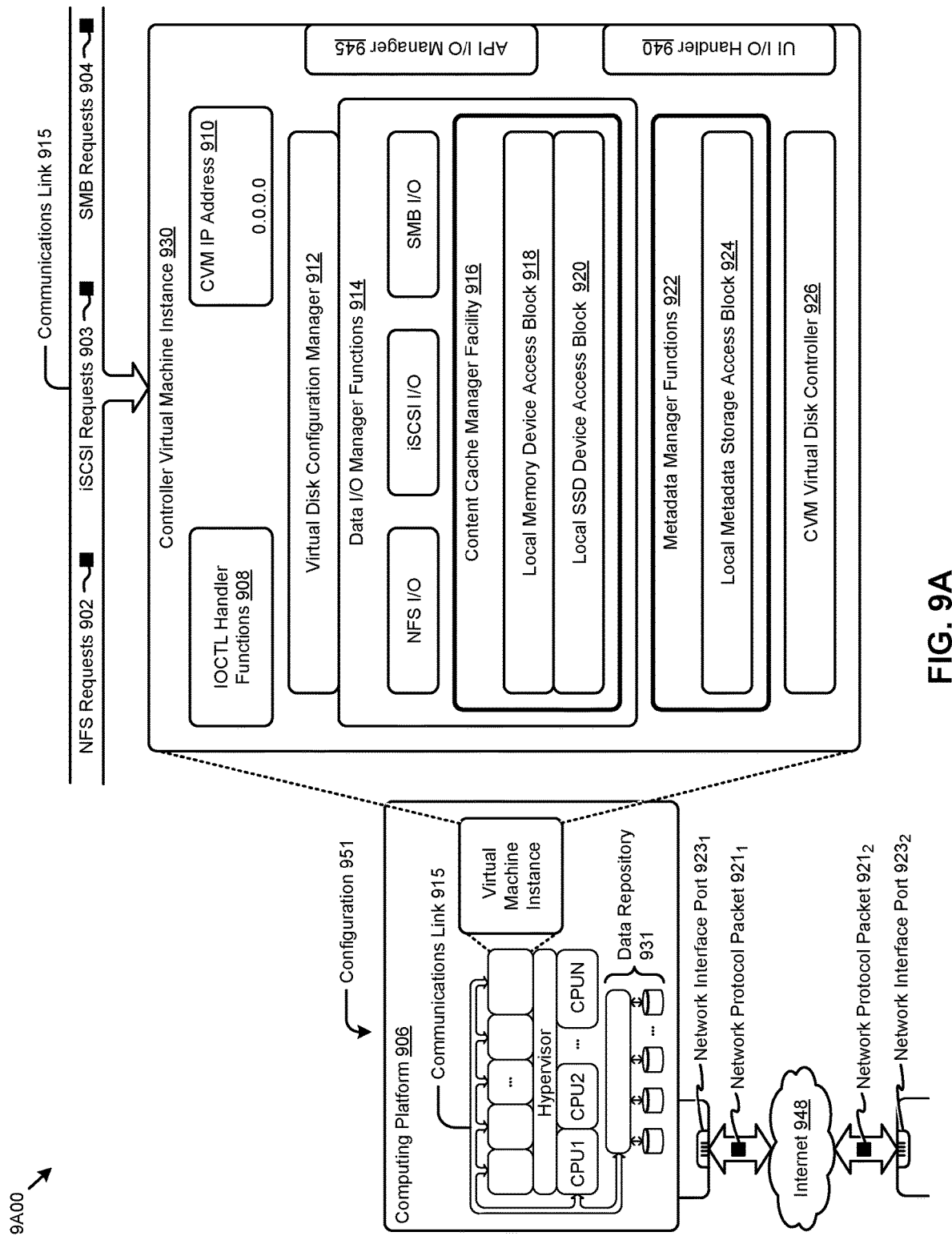
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 930 includes content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, ... , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to high-performance processing of application configuration data. In some embodiments, a module may include one or more state machines and/or combinational logic used to implement or facilitate the operational and/or performance characteristics pertaining to high-performance processing of application configuration data.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of high-performance processing of virtual machine configuration data). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to high-performance processing of virtual machine configuration data, and/or for improving the way data is manipulated when performing computerized operations pertaining to timestamping changes to application configuration metadata so as to eliminate performance of duplicative snapshot operations.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
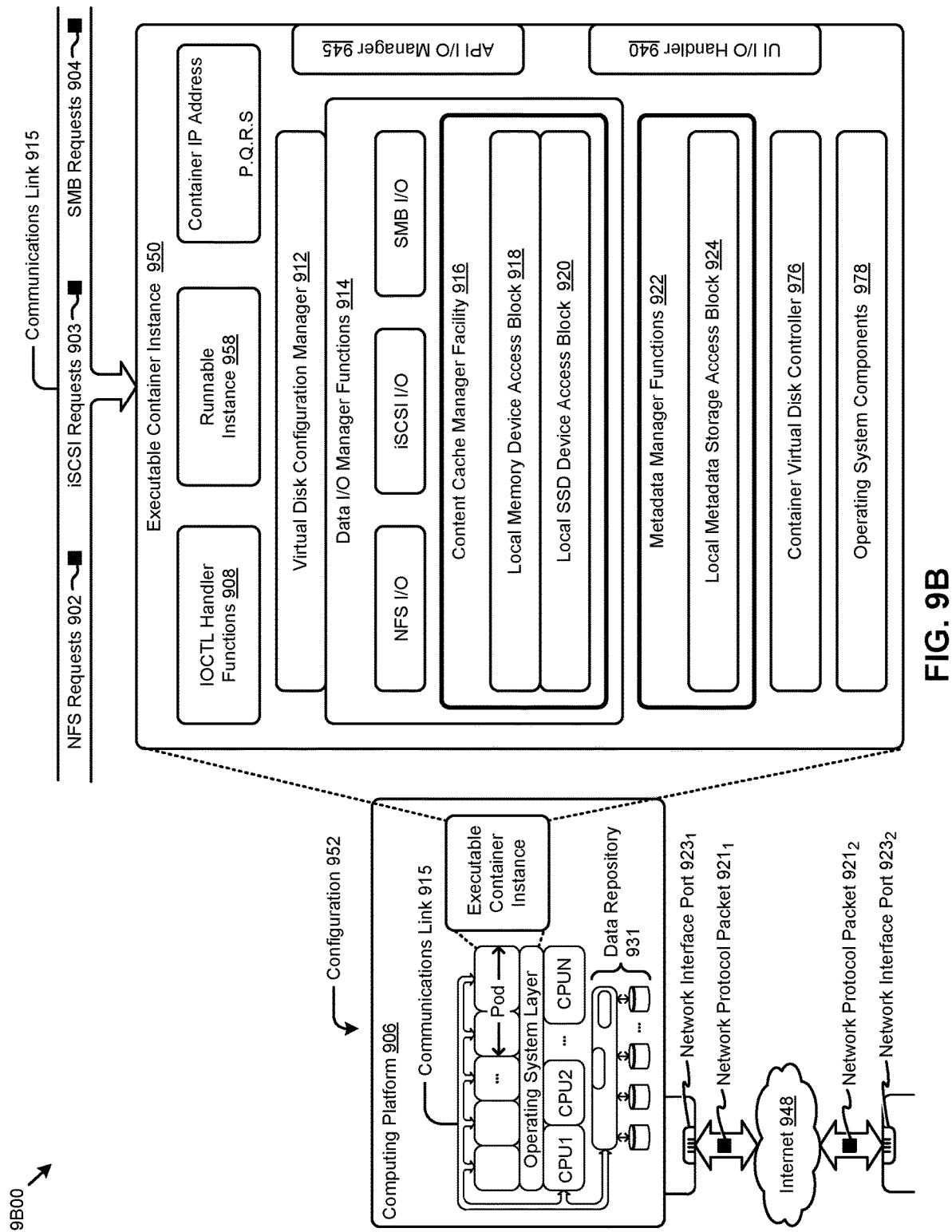

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to the executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
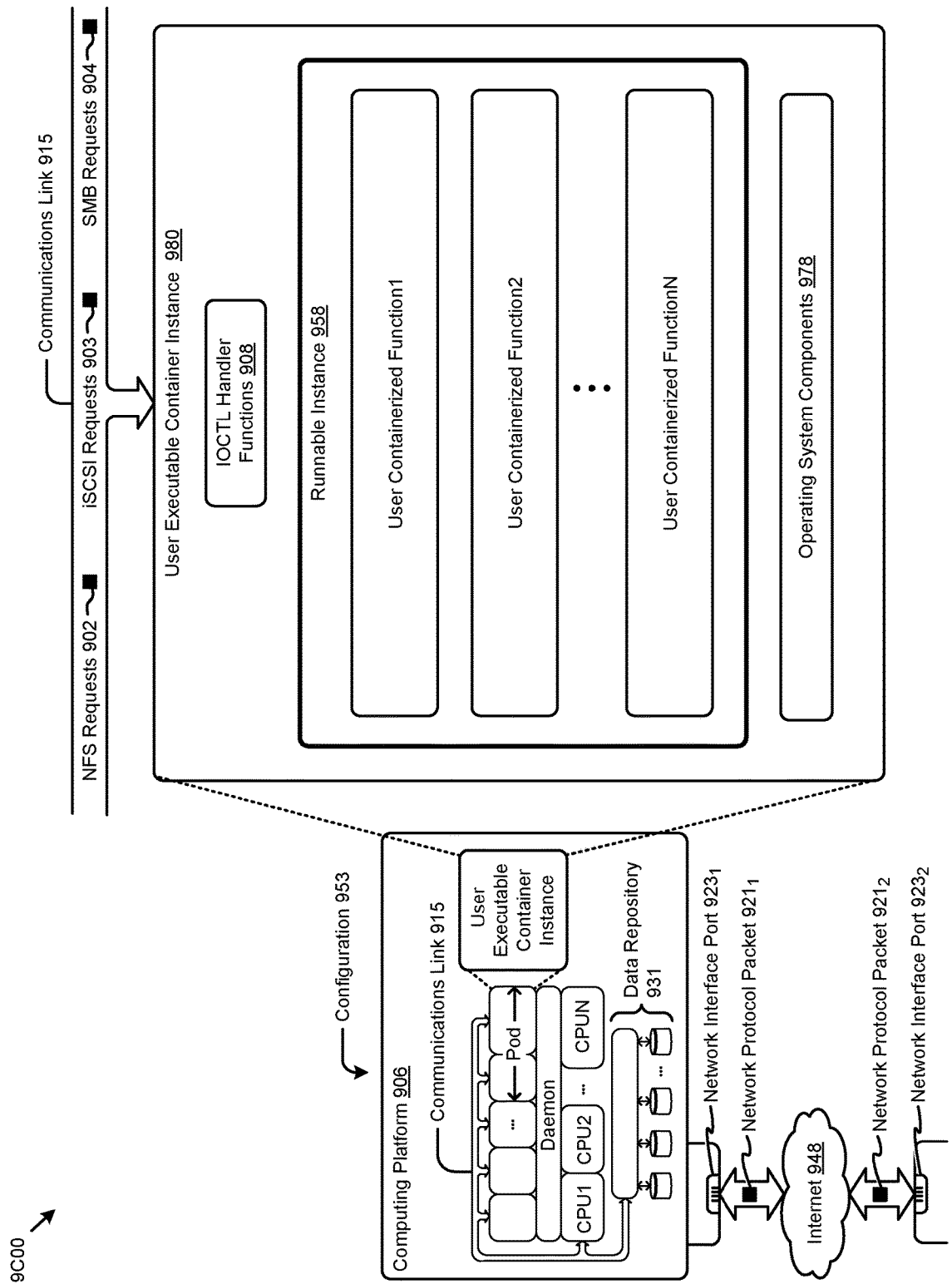

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage where the tiers of storage might be formed using the shown external data repository 931 and/or any forms of network accessible storage. As such, the multiple tiers of storage may include storage that is accessible over communications link 915. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for establishing restore points of an application configuration, the method comprising:
   issuing queries for application configuration metadata, wherein the queries are issued to collect the application configuration metadata from a hypervisor of a virtualization system;
   generating higher frequency restore points that refer to lower frequency snapshots for the application configuration metadata, by:
      receiving a response to a first query, the response received from a hypervisor of the virtualization system that includes the application configuration metadata which describes a configuration of an application running in the virtualization system;
      generating a first snapshot of application configuration metadata using the response to the first query;
      establishing restore points at a first frequency, including a first restore point which corresponds to the first snapshot of application configuration metadata; and
      establishing a second restore point subsequent to the first restore point without issuing another query for the application configuration metadata, wherein the second restore point utilizes the first snapshot of application configuration metadata, such that the first snapshot corresponds to snapshots at a second frequency, the second frequency being lower than the first frequency.

2. The method of claim 1, wherein the second restore point refers to the first snapshot using a table which indicates correspondence of respective restore points to respective snapshots.

3. The method of claim 2, wherein the queries for application configuration metadata are issued at the second frequency lower than the first frequency for establishing restore points.

4. The method of claim 1, wherein the first restore point is established by associating the first snapshot of application configuration metadata with the first restore point.

5. The method of claim 1, further comprising:
   determining whether there has been a change in the application configuration metadata from the application configuration metadata in the first snapshot;
   when determining that there has been a change in the application configuration metadata from the application configuration metadata in the first snapshot, then:
      issuing a second query for application configuration metadata based on determining that there has been a change in the application configuration metadata, the second query occurring at a time after establishing the second restore point;
      receiving a response to the second query, the response including application configuration metadata;
      generating a second snapshot of application configuration metadata using the response to the first query; and
      establishing a third restore point which includes the second snapshot of application configuration metadata without issuing another query for application configuration metadata and without generating another snapshot of application configuration metadata at least until generating the next restore point.

6. The method of claim 5, wherein determining that there has been a change in the application configuration metadata from the application configuration metadata in the first snapshot comprises:

identifying an updated metadata time indication of the application configuration metadata;

identifying a metadata snapshot generation time indication of the first snapshot of the application configuration metadata;

determining if the updated metadata time indication of the application configuration metadata is equal to the metadata snapshot generation time indication;

when the updated metadata time indication is different than the metadata snapshot generation time indication, then determining that there has been a change in the application configuration metadata from the application configuration metadata in the first snapshot; and when the updated metadata time indication is equal to the metadata snapshot generation time indication, then determining that there has not been a change in the application configuration metadata from the application configuration metadata in the first snapshot.

7. The method of claim 6, further comprising receiving, at a first computing cluster, from a second computing cluster, at least one of the restore points.

8. The method of claim 1, wherein, each query determines a set of entities to be snapshotted.

9. The method of claim 1, wherein each query is issued to the hypervisor that collects the then-current application configuration metadata corresponding to at least one of: (1) how virtualized entities are provisioned, (2) how the virtualized entities are related; or (3) how particular ones of the virtualized entities interact with other virtualized entities.

10. A non-transitory computer readable medium having stored thereon a sequence of instructions which, when stored in memory and executed by a processor causes the processor to perform a set of acts for establishing restore points of an application configuration, the set of acts comprising:

issuing queries for application configuration metadata, wherein the queries are issued to collect the application configuration metadata from a hypervisor of a virtualization system;

generating higher frequency restore points that refer to lower frequency snapshots for the application configuration metadata, by:

receiving a response to a first query, the response received from a hypervisor of the virtualization system that includes the application configuration metadata which describes a configuration of an application running in the virtualization system;

generating a first snapshot of application configuration metadata using the response to the first query;

establishing restore points at a first frequency, including a first restore point which corresponds to the first snapshot of application configuration metadata; and establishing a second restore point subsequent to the first restore point without issuing another query for the application configuration metadata, wherein the second restore point utilizes the first snapshot of application configuration metadata, such that the first snapshot corresponds to snapshots at a second frequency, the second frequency being lower than the first frequency.

11. The computer readable medium of claim 10, wherein the second restore point refers to the first snapshot using a table which indicates correspondence of respective restore points to respective snapshots.

12. The computer readable medium of claim 11, wherein the queries for application configuration metadata are issued at the second frequency lower than the first frequency for establishing restore points.

13. The computer readable medium of claim 11, wherein the first restore point is established by associating the first snapshot of application configuration metadata with the first restore point.

14. The computer readable medium of claim 10, the set of acts further comprising:

determining whether there has been a change in the application configuration metadata from the application configuration metadata in the first snapshot;

when determining that there has been a change in the application configuration metadata from the application configuration metadata in the first snapshot, then:

issuing a second query for application configuration metadata based on determining that there has been a change in the application configuration metadata, the second query occurring at a time after establishing the second restore point;

receiving a response to the second query, the response including application configuration metadata;

generating a second snapshot of application configuration metadata using the response to the first query; and establishing a third restore point which includes the second snapshot of application configuration metadata without issuing another query for application configuration metadata and without generating another snapshot of application configuration metadata at least until generating the next restore point.

15. The computer readable medium of claim 14, wherein determining that there has been a change in the application configuration metadata from the application configuration metadata in the first snapshot comprises:

identifying an updated metadata time indication of the application configuration metadata;

identifying a metadata snapshot generation time indication of the first snapshot of the application configuration metadata;

determining if the updated metadata time indication of the application configuration metadata is equal to the metadata snapshot generation time indication;

when the updated metadata time indication is different than the metadata snapshot generation time indication, then determining that there has been a change in the application configuration metadata from the application configuration metadata in the first snapshot; and when the updated metadata time indication is equal to the metadata snapshot generation time indication, then determining that there has not been a change in the application configuration metadata from the application configuration metadata in the first snapshot.

16. The computer readable medium of claim 15, wherein the set of acts further comprises:

receiving, at a first computing cluster, from a second computing cluster, at least one of the restore points.

17. The computer readable medium of claim 10, wherein, each query determines a set of entities to be snapshotted.

18. The computer readable medium of claim 10, wherein each query is issued to the hypervisor that collects the then-current application configuration metadata corresponding to at least one of: (1) how virtualized entities are provisioned, (2) how the virtualized entities are related; or (3) how particular ones of the virtualized entities interact with other virtualized entities.

19. A system for establishing restore points of an application configuration, the system comprising:

a storage medium having stored thereon a sequence of instructions; and a processor that executes the instructions to cause the processor to perform a set of acts, the set of acts comprising,
   issuing queries for application configuration metadata, wherein the queries are issued to collect the application configuration metadata from a hypervisor of a virtualization system;
   generating higher frequency restore points that refer to lower frequency snapshots for the application configuration metadata, by:
      receiving a response to a first query, the response received from a hypervisor of the virtualization system that includes the application configuration metadata which describes a configuration of an application running in the virtualization system;
      generating a first snapshot of application configuration metadata using the response to the first query;
      establishing restore points at a first frequency, including a first restore point which corresponds to the first snapshot of application configuration metadata; and
      establishing a second restore point subsequent to the first restore point without issuing another query for the application configuration metadata, wherein the second restore point utilizes the first snapshot of application configuration metadata, such that the first snapshot corresponds to snapshots at a second frequency, the second frequency being lower than the first frequency.

20. The system of claim 19, wherein the second restore point refers to the first snapshot using a table which indicates correspondence of respective restore points to respective snapshots.

21. The system of claim 20, wherein, the queries for application configuration metadata are issued at the second frequency lower than the first frequency for establishing restore points.

22. The system of claim 20, wherein the first restore point is established by associating the first snapshot of application configuration metadata with the first restore point.

23. The system of claim 19 wherein the set of acts further comprises:
   determining whether there has been a change in the application configuration metadata from the application configuration metadata in the first snapshot;
   when determining that there has been a change in the application configuration metadata from the application configuration metadata in the first snapshot, then:
      issuing a second query for application configuration metadata based on determining that there has been a change in the application configuration metadata, the second query occurring at a time after establishing the second restore point;
      receiving a response to the second query, the response including application configuration metadata;
      generating a second snapshot of application configuration metadata using the response to the first query; and
      establishing a third restore point which includes the second snapshot of application configuration metadata without issuing another query for application configuration metadata and without generating another snapshot of application configuration metadata at least until generating the next restore point.

24. The system of claim 23, wherein
determining that there has been a change in the application configuration metadata from the application configuration metadata in the first snapshot comprises:
   identifying an updated metadata time indication of the application configuration metadata;
   identifying a metadata snapshot generation time indication of the first snapshot of the application configuration metadata;
   determining if the updated metadata time indication of the application configuration metadata is equal to the metadata snapshot generation time indication;
   when the updated metadata time indication is different than the metadata snapshot generation time indication, then determining that there has been a change in the application configuration metadata from the application configuration metadata in the first snapshot; and
   when the updated metadata time indication is equal to the metadata snapshot generation time indication, then determining that there has not been a change in the application configuration metadata from the application configuration metadata in the first snapshot.

25. The system of claim 24, wherein the set of acts further comprises receiving, at a first computing cluster, from a second computing cluster, at least one of the restore points.

26. The system of claim 19, wherein each query determines a set of entities to be snapshotted.

27. The system of claim 19, wherein each query is issued to the hypervisor that collects the then-current application configuration metadata corresponding to at least one of: (1) how virtualized entities are provisioned, (2) how the virtualized entities are related; or (3) how particular ones of the virtualized entities interact with other virtualized entities.

* * * * *